US 7,857,971 B2

(12) United States Patent
del Pino Suarez

(10) Patent No.: US 7,857,971 B2
(45) Date of Patent: Dec. 28, 2010

(54) FILTER FUEL ASSEMBLY

(76) Inventor: Carlos del Pino Suarez, Cond. Club Costa #1 Apt. 4R, Carolina, PR (US) 00983

( * ) Notice: Subject to any disclaimer, the term of this patent is extended or adjusted under 35 U.S.C. 154(b) by 1042 days.

(21) Appl. No.: 11/642,082

(22) Filed: Dec. 20, 2006

(65) Prior Publication Data
US 2008/0149550 A1    Jun. 26, 2008

(51) Int. Cl.
B01D 27/06    (2006.01)
B01D 27/08    (2006.01)
B01D 35/30    (2006.01)

(52) U.S. Cl. .................. 210/232; 210/315; 210/440; 210/443; 210/450

(58) Field of Classification Search .......... 210/232, 210/443, 440, 315, 450
See application file for complete search history.

(56) References Cited

U.S. PATENT DOCUMENTS

| 1,107,485 | A | * | 8/1914 | Bowser | 210/304 |
|---|---|---|---|---|---|
| 1,251,601 | A | * | 1/1918 | Weiwonda | 210/443 |
| 1,991,644 | A | * | 2/1935 | Wolters | 210/312 |
| 2,023,423 | A | * | 12/1935 | Kleckner | 210/452 |
| 2,615,573 | A | * | 10/1952 | Storey | 210/130 |
| 3,880,757 | A | * | 4/1975 | Thomason | 210/167.28 |
| 4,091,265 | A | * | 5/1978 | Richards et al. | 219/501 |
| 4,387,691 | A | | 6/1983 | Marcoux et al. | |
| 4,421,090 | A | | 12/1983 | Davis | |
| 4,452,697 | A | | 6/1984 | Conrad | |
| 4,473,054 | A | | 9/1984 | Marcoux et al. | |
| 4,579,653 | A | | 4/1986 | Davis | |
| 4,676,895 | A | | 6/1987 | Davis | |
| 4,680,110 | A | | 7/1987 | Davis | |
| 4,683,055 | A | | 7/1987 | Bosch et al. | |
| 4,702,790 | A | * | 10/1987 | Hogh et al. | 156/293 |
| 4,706,636 | A | | 11/1987 | Davis | |
| 4,968,323 | A | | 11/1990 | Blackburn et al. | |
| 5,171,430 | A | * | 12/1992 | Beach et al. | 210/94 |
| 5,215,658 | A | * | 6/1993 | Luby | 210/232 |
| 5,259,953 | A | * | 11/1993 | Baracchi et al. | 210/232 |
| 5,507,942 | A | | 4/1996 | Davis | |
| 5,547,572 | A | | 8/1996 | Stone | |
| 5,622,623 | A | | 4/1997 | Stone | |
| 5,662,800 | A | * | 9/1997 | Sugiura | 210/234 |
| 5,683,586 | A | | 11/1997 | Harcourt et al. | |
| 5,766,449 | A | | 6/1998 | Davis | |
| 5,888,399 | A | | 3/1999 | Rutledge et al. | |
| 5,904,844 | A | | 5/1999 | Stone | |
| 6,042,722 | A | | 3/2000 | Lenz | |
| RE37,165 | E | | 5/2001 | Davis | |
| 6,293,410 | B1 | | 9/2001 | Forbes | |
| 6,432,298 | B1 | | 8/2002 | Carvalko, Jr. | |
| 6,493,508 | B1 | | 12/2002 | Roesgen | |

(Continued)

Primary Examiner—Thomas M Lithgow
(74) Attorney, Agent, or Firm—Héctor M. Reyes-Rivera

(57) ABSTRACT

The present invention describes a fuel filter assembly useful in the purification of fuels such as diesel, gasoline, jet fuel, kerosene, heating oil and similar liquids. The fuel filter assembled herein described separates solids and semisolids particulates such as algae, microbial growth, fungi and the like from fuel, providing a much cleaner fuel to secondary fuel system, engine and fuel consuming devices. The said fuel filtering assembly comprises a removable lid mounted at the top of an upright vertical housing, a non-disposable removable filter unit enclosed in the internal cavity of the said housing and a multi-purpose base comprising fuel inlet and fuel outlet as internal passages within the said base.

16 Claims, 11 Drawing Sheets

U.S. PATENT DOCUMENTS

| | | |
|---|---|---|
| 6,596,174 B1 | 7/2003 | Marcus |
| 6,702,948 B1 | 3/2004 | Oberlander |
| 6,709,576 B2 | 3/2004 | Jokschas |
| 7,025,797 B2 | 4/2006 | Zettel |
| 7,115,199 B2 | 10/2006 | Simonson |
| 7,137,246 B2 | 11/2006 | van Nieuwstadt et al. |

\* cited by examiner

FILTER FUEL ASSEMBLY

FIELD OF THE INVENTION

The present invention relates to a filter assembly and method of separation of organic and inorganic particulates from liquids. More particularly, the invention is directed to a filter assembly and methods of using the said assembly in the purification of organic liquids such as fuels from solids and semisolids particulates such as algae, fungus, microbial growth, rust and the like.

BACKGROUND OF THE INVENTION

It is well known that the presence of particulates or contaminants in stored fuel liquids such as diesel, jet fuel, kerosene, gasoline, heating oil and similar liquids represents a real problematic situation affecting negatively the quality of the fuel and the performance of engines requiring the said fuel for its intended functioning. Many of the said contaminants are generated by the presence of water in the fuel. Once water is condensed in the fuel container, it provides a rich environment for the bacterial, fungus, algae and other microbial growth. Similarly, water promotes the oxidation of the container producing rust and similar solids. These fuel contaminants may be transported together with the fuel flow to the fuel filtration conduits, engines and fuel consuming devices producing expensive damages to the said filtration lines engines and devices. Marine transportation devices such as boats and ships, automobiles and trucks, airplanes and statutory generators are examples of machinery that are negatively affected by the said particulate or fuel contaminants. The said particulates or contaminants produce fuel degradation, clogging of filters and even they may induce the engine failure. As possible solutions to this problem, multiple sophisticated and expensive solutions have been presented by the prior art. A variety of filters equipped with cartridges of multiple designs, magnetic devices, water filters and chemical compositions have been proposed and currently used. However, these alternatives do not avoid the constant water condensation in the tank or fuel container and thus, the proposed alternatives cannot eliminate the constant generation of the said contaminants.

Therefore, it would be desirable to provide an economical, simple fuel filter assembly, capable of avoiding the clogging of fuel engines. It would also be desirable to provided a fuel flow assembly able to extend the productive life of the remaining filtering media the engine and simultaneously reducing dramatically the maintenance, reparations and filters change costs while improving significantly the performance of machinery that are negatively affected by the said particulate or fuel contaminants.

SUMMARY OF THE INVENTION

It is an object of the present invention to provide a fuel filter assembly capable to separate solid and semisolid contaminants such as algae, fungus, microbial growth and similar organic growth or particulate matter such as rust from fuel in order to avoid the clogging of filtering lines and engines. Another object of the invention is to provide an efficient fuel filter assembly able to separates solid or semisolid contaminants from fuels such as diesel, jet fuel, kerosene, gasoline, heating oil and similar liquids in order to improve the functioning of machines requiring the said fuels.

A further object of the invention is to provide an economical, easy to use and easy to clean fuel filter assembly having a non-disposable but easy removable filtering unit. Still another further object of the instant invention is to provide a fuel filter assembly, easy to install and that may be use in the fuel flow system line that transfers the fuel from the fuel tank to the engine; a fuel filter assembly that is also useful in cleaning fuel contained in the tank or in any suitable fuel container by returning the clean fuel to the said tank or container once the filtration process has been performed.

Still another object of the instant invention is to provide a fuel filter assembly that provides a visual way to indicate the proper time to clean its filter unit and able to reduce the maintenance cost of fuel engines and disposable filters by providing a cleaner fuel through the fuel flow systems and to engines.

These and other objectives have been achieved in accordance with the instant invention by providing a fuel filter assembly suitable to separate solid and semisolid particulate or contaminants from fuels and similar liquids; wherein the said fuel filter assembly comprises a vertical upright housing that may be made of transparent material, having an upper end and a lower end; a removable lid located in the upper end of the said vertical upright housing; means for tightly secure the said removable lid to the said housing and simultaneously sealing the pass of the fuel outside of the said housing; a base located at the lower end of the said vertical upright housing, said base comprising a fuel flow inlet and a fuel flow outlet; wherein the said fuel inlet and fuel outlet communicate with the internal cavity of the said housing; means for tightly secure the said base to the said housing and simultaneously sealing the pass of the fuel outside the housing and thus only allowing the pass of the fuel flow outside the said housing via the fuel flow outlet; a removable non-disposable filtering unit enclosed in the interior section of the said housing, said filtering unit having a lower end and an upper end and a fuel delivering unit for delivering the unfiltered fuel flow from the said fuel flow inlet to the said upper part of the said filtering unit.

The filter assembly allows the fuel flow to pass from the tank directly to the top of the removable easy to clean filtering unit, whereby the solid and semisolid contaminants are trap on the inside area of the filter unit. After filtration, the fuel flow may be redirected to the tank if the filter is installed to clean the tank fuel or alternatively, it may be directed to the engine if the filter device has been installed between the tank and the engine fuel filtering system. When used in the tank-engine line, the herein disclosed fuel filter assembly is able to filter contaminants such as algae, fungus, microbial growth, rust and similar ones that would degrade the fuel and would also decrease the performance of the engine if left within the fuel. The said fuel filter assembly increases the productive life of the engine and the fuel filtering line system, reducing the maintenance cost of the engine system of the vehicle.

BRIEF DESCRIPTION OF THE DRAWINGS

The invention will be described in further detail herein after with reference to the illustrative preferred embodiments shown in the accompanying following drawings, which are included for illustrative purposes without limiting the invention in any manner.

FIG. 4 is a top view of the said lid. FIG. 5 is an upside down view of the said lid.

DETAILED DESCRIPTION OF THE PREFRRED EMBODIMENTS

Detailed embodiments of the instant invention are disclosed herein, however it is to be understood that the disclosed embodiments are only examples and that the disclosed invention may be embodied in alternative forms and/or in other possible variations. The particular structural and functional details disclosed herein should not be interpreted as limiting, since they are presented as a basis for the claims and with the main objective of teaching those skilled in the art to make and use the instant invention. Particularly, shapes of the required units comprising the fuel filter assembly disclosed herein may be substituted by other alternative shapes without departing from the scope of the instant invention. Relative size of the fuel filter assembly and its units may vary depending of the volume of the flow requiring filtration and/or the amount of contaminants containing in the fuel. It is understood that the filter assembly may be use to separate solid material from non-fuel liquids.

Figure 1:
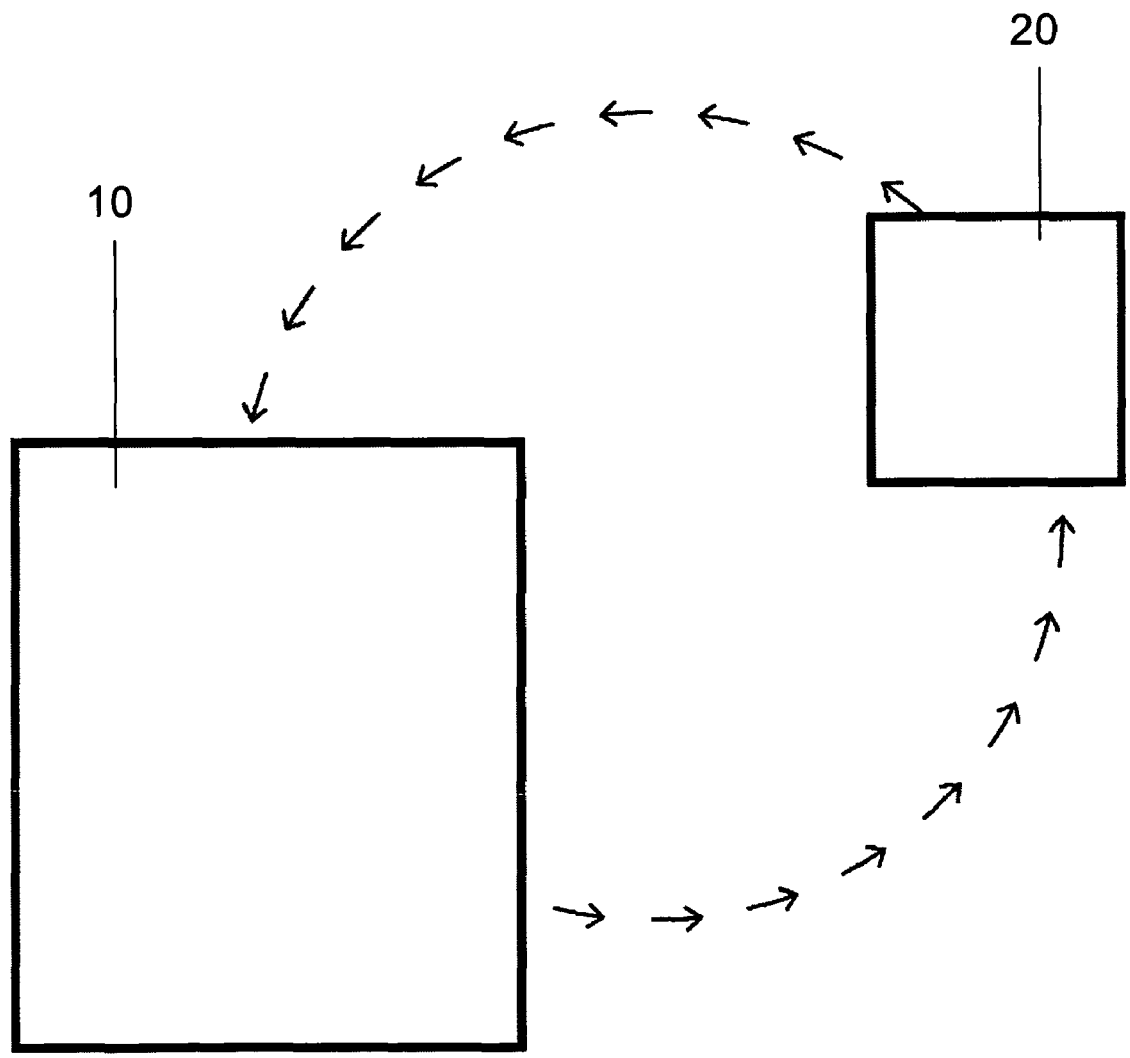
FIG. 1 is the schematic representation of a circular or continuous purification of fuel within a container or tank, wherein once the fuel is filtered it is returned to the said container.
Figure 2:
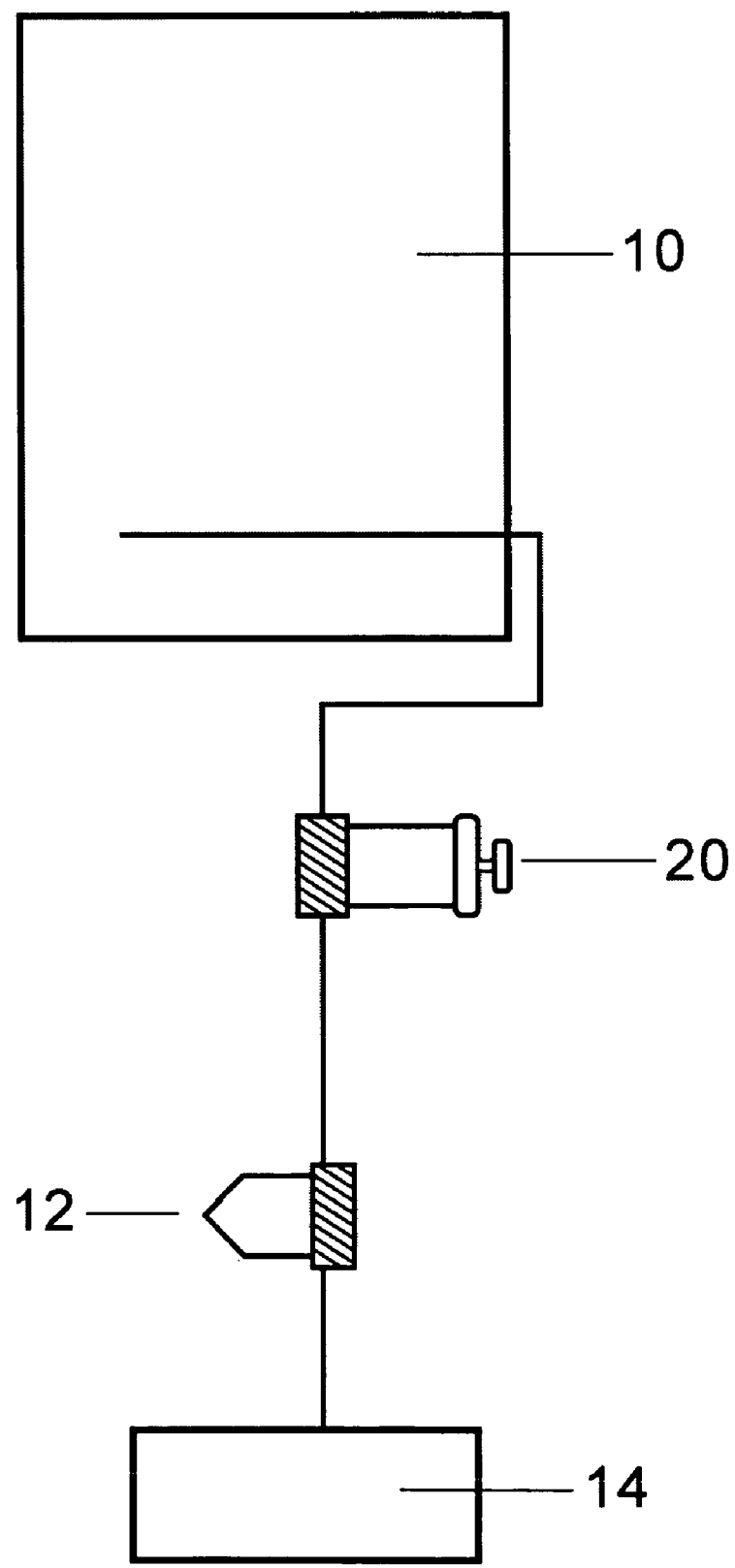
FIG. 2 is the schematic representation of one of the preferred location of the fuel filter assembly when installed in the filtering line wherein the fuel flow is transferred from the fuel tank to the engine of a given vehicle or machine or to a fuel consuming device.

FIG. 1 and FIG. 2 are provided to schematically illustrate the preferred installation of the fuel filter assembly in order to achieve the purification of fuels. Regarding FIG. 1, the fuel filter assembly 20 is schematically shown in an continuous filtration system, wherein it is installed in order to separate particulate such as rust, algae, fungus and similar microbial growth from the fuel tank 10 and the purified fuel is continuously returned to the said container 10. In another feasible embodiment, the purified fuel may be deposited in any other container not illustrated.

FIG. 2 illustrates schematically a preferred location of the fuel filter assembly 20 in the fuel filtering system of a given vehicle or fuel consuming device. The fuel filter assembly 20 is located after fuel tank 10 and before the rest of the filtering systems 12 in such a way that fuel supply not containing solid or semisolid particulates or contaminants is provided to secondary filtration systems 12, the engine or any fuel consuming device 14. The said position may be alternate or even combine by installing more than one assembly 20 on different position of the said fuel filtering route.

In cold environments, fuel flow may be heated with a resistance heating unit or element (not illustrated) previous to entering into the fuel filtering assembly 20, in order to melt paraffin and waxes that may be present in the fuel due to the low temperatures. In other embodiments, the said resistance heating element or unit may be adapted in any place of the instant fuel filtering unit 20.

Figure 3:
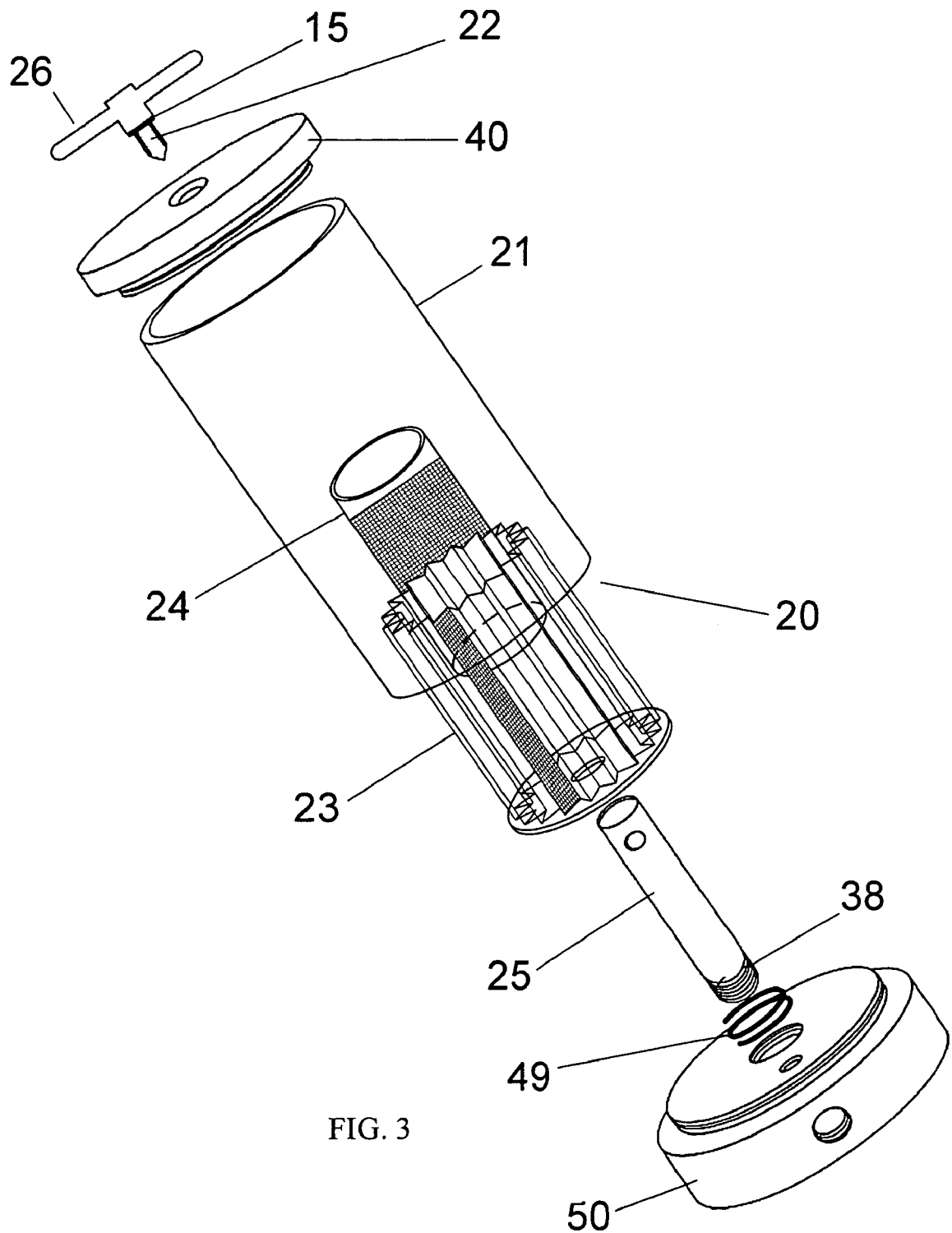
FIG. 3 shows a perspective view of the prototype of the individual parts comprising the fuel filter in the order they are assembled.

In the preferred embodiment, as illustrated in FIG. 3, fuel filter assembly 20 comprises a T-shape handle 26, a lid or cap 40; a solid and rigid vertical upright housing or casing 21; a multi purpose base 50 providing inlet and outlet fuel conduits; an easily removable and non disposable filtering unit having at least two subunits 23 and 24; a pressing element 49 and a fuel delivering unit 25.

Housing 21 may be made of a transparent, pressure resistant, non-fuel reactant suitable material such as plastic. It also may be made of metal such as stainless steel, aluminum, bronze, copper, or any similar suitable metal or combination thereof Similarly, T-shape handle 26, lid 40, base 50, filtering units 23 and 24 and fuel delivering unit 25 may be made of any pressure resistant, non-fuel reactant, suitable materials such as plastic or any suitable metal, for example stainless steel, aluminum, bronze, copper, any similar metal or combination thereof.

Figure 4:
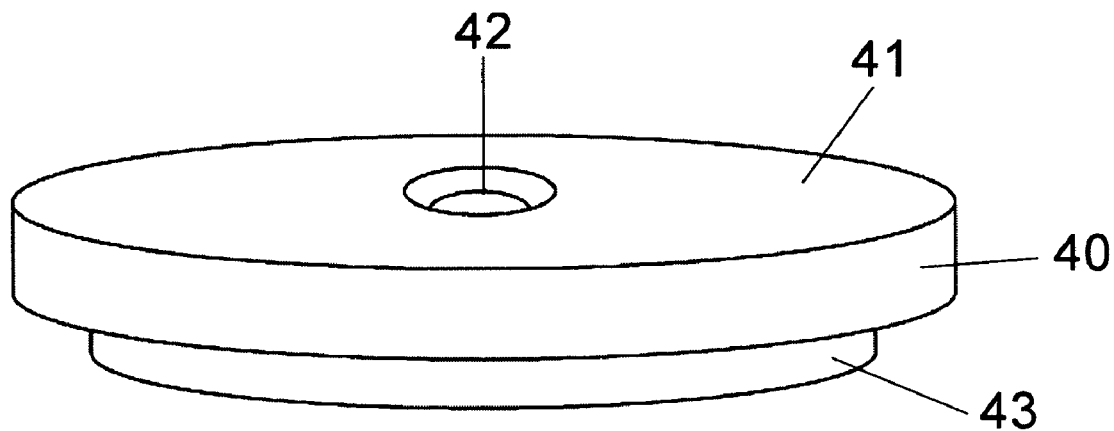
FIG. 4 and FIG. 5 illustrate views of a prototype of the removable lid or cap 40.
Figure 5:
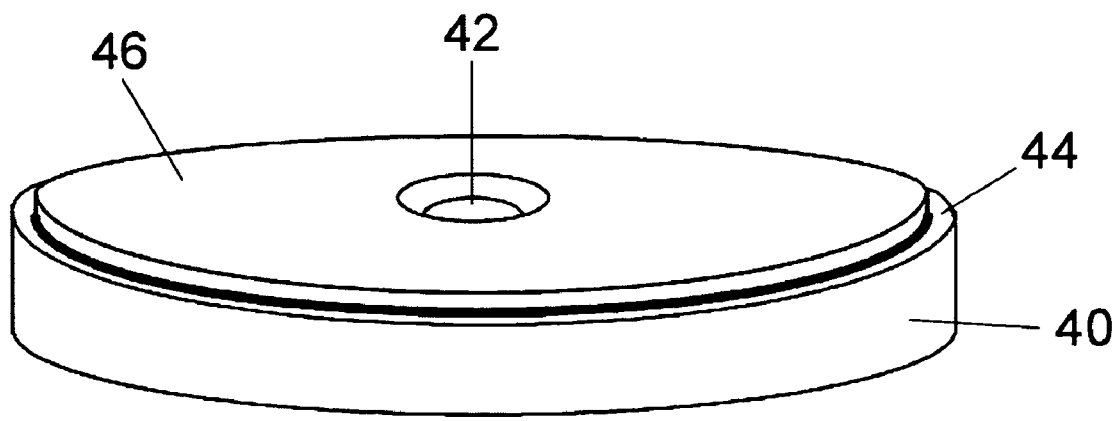

FIG. 4 and FIG. 5 show perspective views of lid 40. FIG. 4 shows external surface 41 of the said lid having opening 42 substantially at the middle of lid 40 and an inner circumference 43. On the other hand, FIG. 5 shows inner surface 46 and annular sealing element 44 helping to prevent fuel leaking from the top section of the fuel filter assembly.

As shown in FIG. 3, lid or cap 40 is mounted or assembled in the upper section of housing 21, forming a sealed environment between the housing 21 and the said cap 40. As the means for securing and sealing the said cap 40 to the upper end of the housing 21, the T-shape screw 26 having its lower section 22 threaded and an annular sealing element 15 around it, is inserted through opening 42, and further threading end section 22 into the internal threaded section of fuel delivering unit 25. However, any means for tightly securing the cap 40 to the housing 21 and simultaneously avoiding the fuel leak out of the upper section of the fuel filter assembly 20, such as the use of grasping units, rings, clamps, or the like may be used to practice the invention, since any other detachable connection between lid 40 and upper section of housing 21 are feasible.

Figure 6:
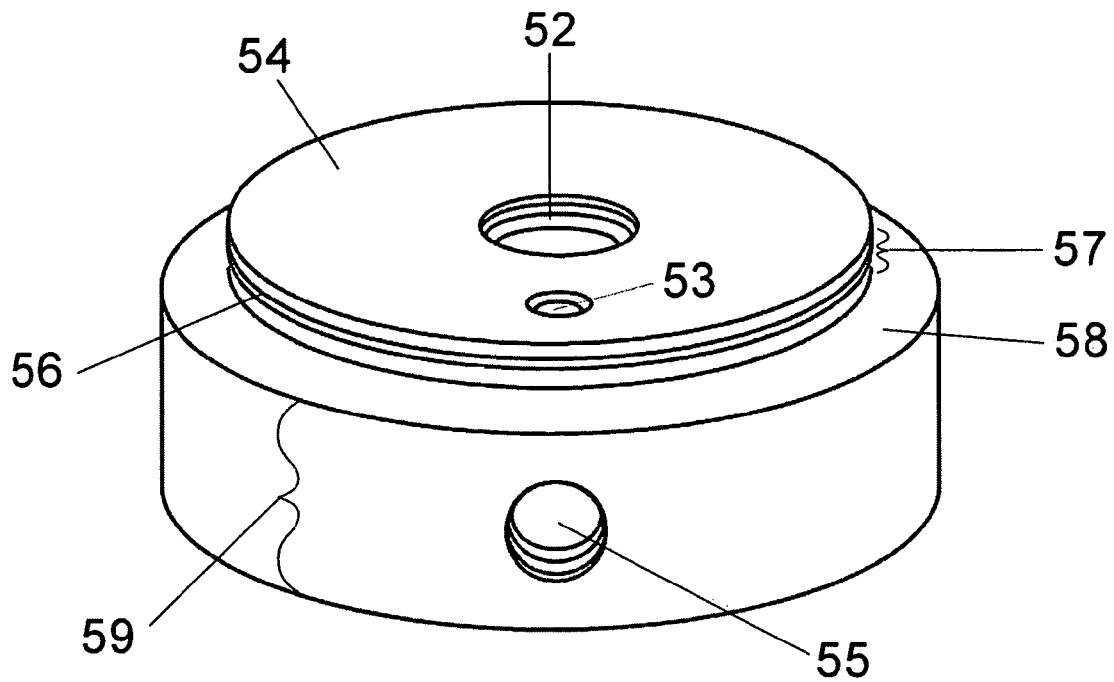
FIG. 6 is a perspective view of the front side of the prototype of the base 50 of the fuel filter assembly.
Figure 7:
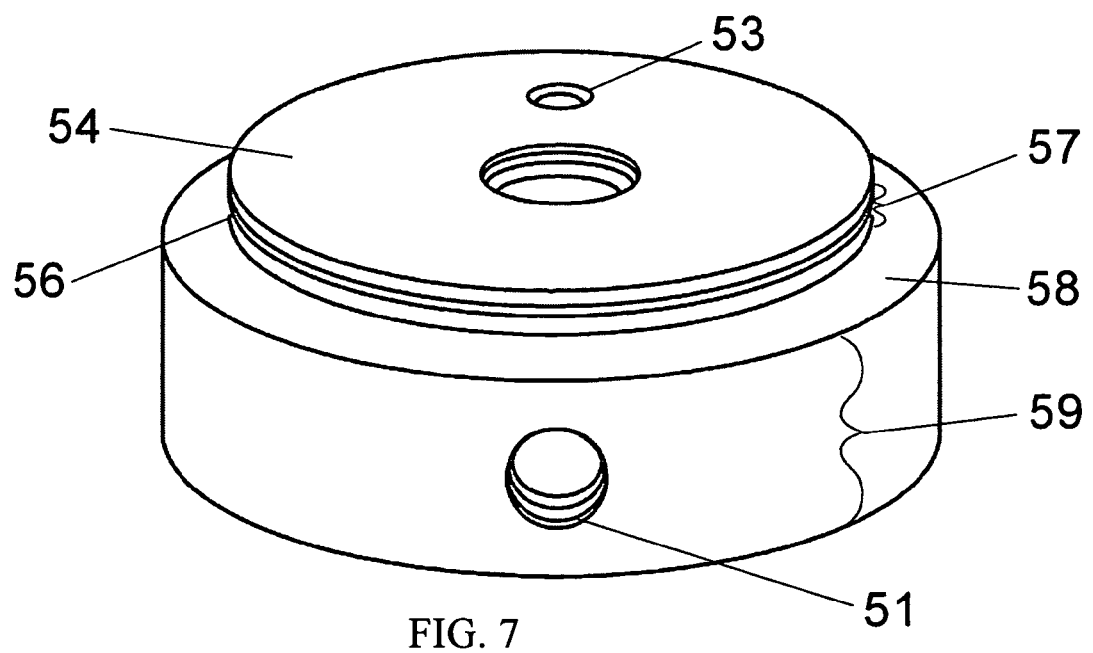
FIG. 7 is a perspective view of the back side of the said base.

Regarding FIG. 6 and FIG. 7, it show details of the prototype base 50, which comprises a first flat surface 54 resting under a larger second flat surface 58 and lower lateral side 59 having an upper lateral side 57. Annular sealing element 56 is located substantially in the center of the said upper lateral side 57 in order to prevent fuel leaking from the housing cavity. Housing 21 internal diameter is slightly larger that the circumference of surface 54, thus allowing the insertion of the lower end of housing 21 in base 50 and in such a way that the upper lateral side 57 tightly fits inside the lower end of housing 21 and upper flat surface 54 becomes the internal floor of the filtering cavity of the fuel filter assembly 20. The said connection provides a fuel seal environment from where no fuel spills out the housing through or drain out from the surroundings of the lower end housing-base connection. Base 50 and housing 21 may also be connected by other means known in the art. For example by threading the corresponding parts of base 50 and housing 21 or by inserting housing 21 in base 50 and holding them together with a ring or similar grasping mechanism.

Base 50 physically integrates fuel flow inlet conduit as well as the fuel flow outlet conduit. On the first flat surface 54, aperture 53 communicates with aperture 55 on the lower lateral side 59, forming an internal conduit or fuel passage defining the fuel flow outlet conduit from where the filtered fuel is delivered out of the fuel filter assembly 20. Aperture 55 is internally threaded and it may be connected to any external line to move the filtered fuel to its desirable destination.

Figure 8:
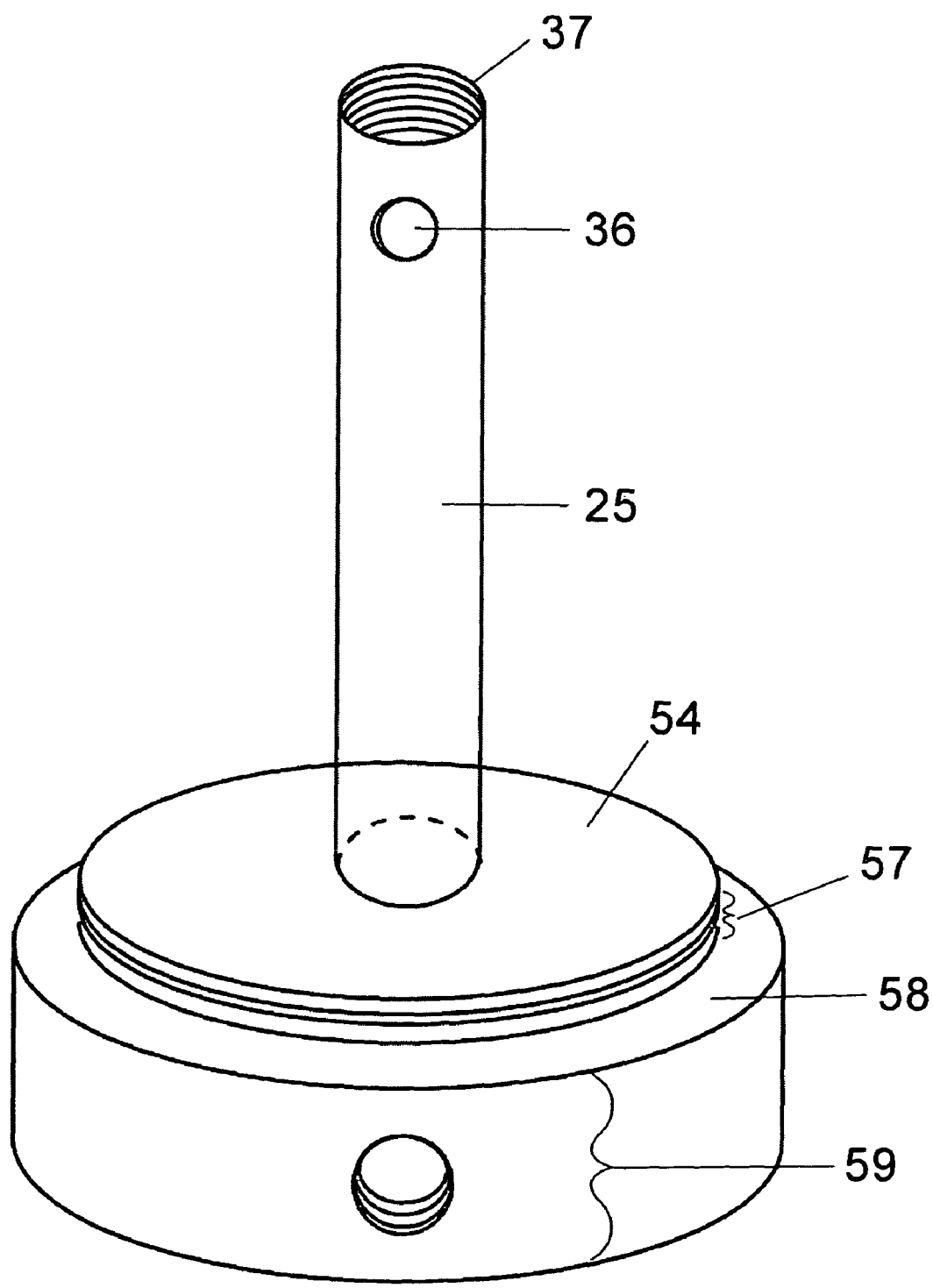
FIG. 8 illustrates a perspective view of the base unit 50 illustrated in FIG. 6 and FIG. 7 with the fuel delivering unit 25 already assembled.

On the other hand, substantially at the opposite side of opening 55 at the lower lateral side 59, aperture 51 is in direct communication with the centered opening 52, forming a conduit or passage from where the fuel flow is allow to enter to the fuel filter assembly 20. Aperture 51 is internally threaded, in such a way that a fuel flow line may be connected to base 50 via the aperture 51. Similarly, aperture 52 is internally threaded, allowing that lower end 38 of fuel delivering unit 25 to be threaded to base 50 as it is illustrated in FIG. 8.

Figure 9:
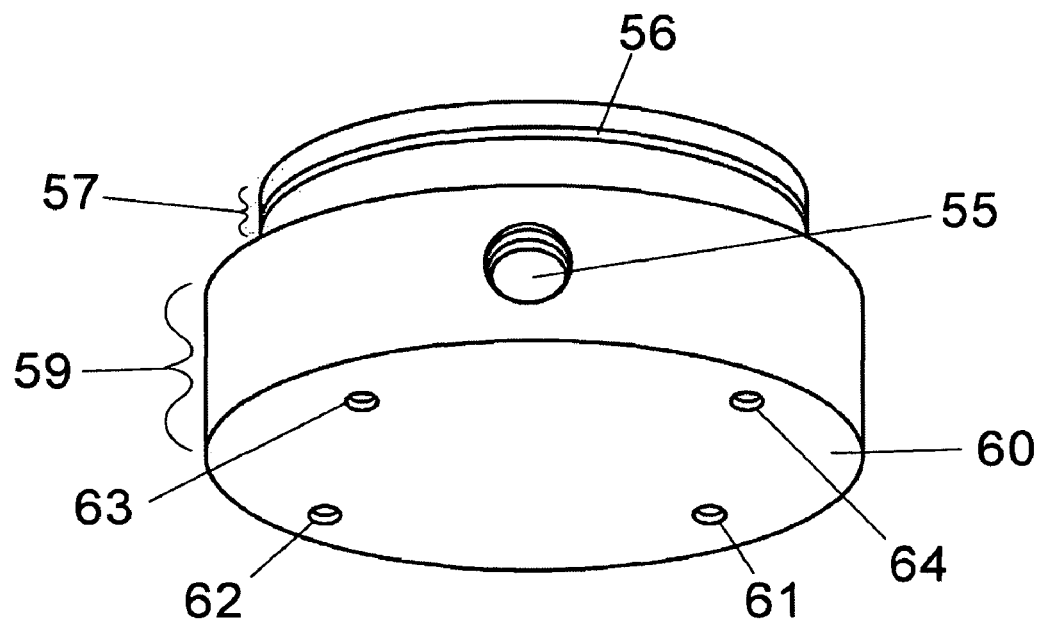
FIG. 9 illustrates a bottom side of the prototype base 50 and FIG. 10 shows the optional stand 70 wherein the device may be firmly secured via fastening of both said parts.
Figure 10:
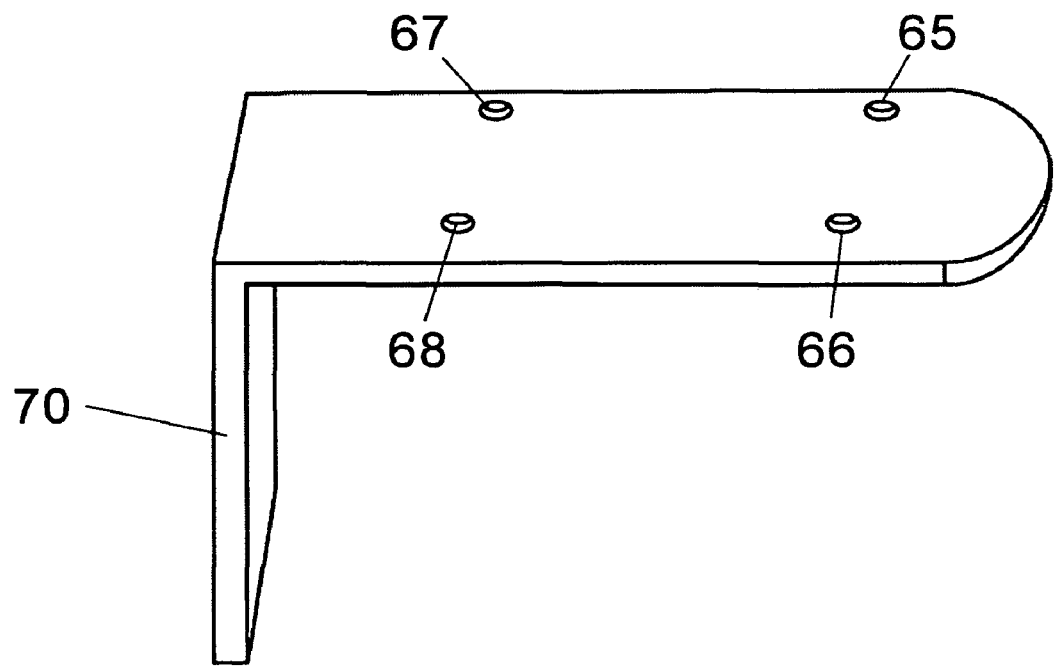

FIG. 9 and FIG. 10 illustrate a practical manner to properly secure fuel filter assembly 20. It may optionally be secured in support 70 via inserting fastening means into holes 61-64 in bottom side 60 of base 50 and the corresponding holes 65-68 in top flat surface 71 of support 70, in such a way that the whole fuel filter assembly 20 may rest safely.

The easy removable, non-disposable filter unit preferably comprises at least two filtering subunits 23 and 24 having a mesh type lateral surface. The sizes of the mesh openings may be variable in size or shape. The said filtering subunits may be made of any suitable material which is pressure resistant and non-fuel reactant for instance plastic, ceramic or metal. The said filtering units may also be made of knitted wire made of stainless steel, copper, aluminum, bronze, any other similar metal or combination thereof as long as the materials are non-fuel reactant and pressure resistant.

Figures 11, 12:
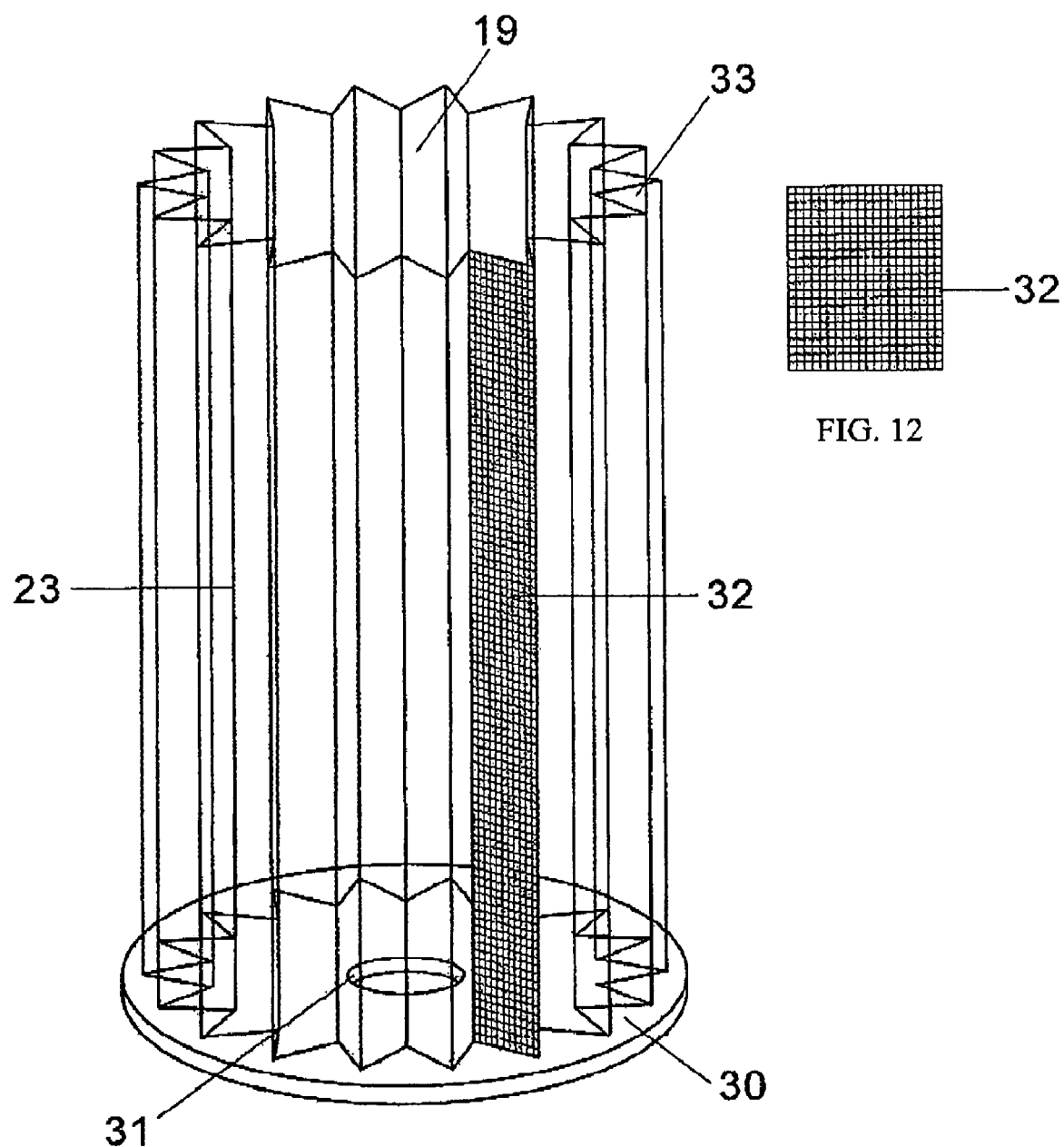
FIG. 11 illustrates a prototype of the filter subunit 23. It has multiple mesh-type openings on its surface and a bottom flat surface with an aperture at substantially the center of the said flat surface and its lateral borders are folded in a zigzag or star pattern. The mesh type surface 32 is illustrated only partially in the said filtering unit 23 in order to illustrate other structural elements of the said filtering subunit, nonetheless it is intended that the complete surface of the lateral sides of the said filtering unit 23 is a mesh type surface.
FIG. 12 is a detail of the mesh type surrounding all lateral sides of the said filter subunit surface 23.
Figure 13:
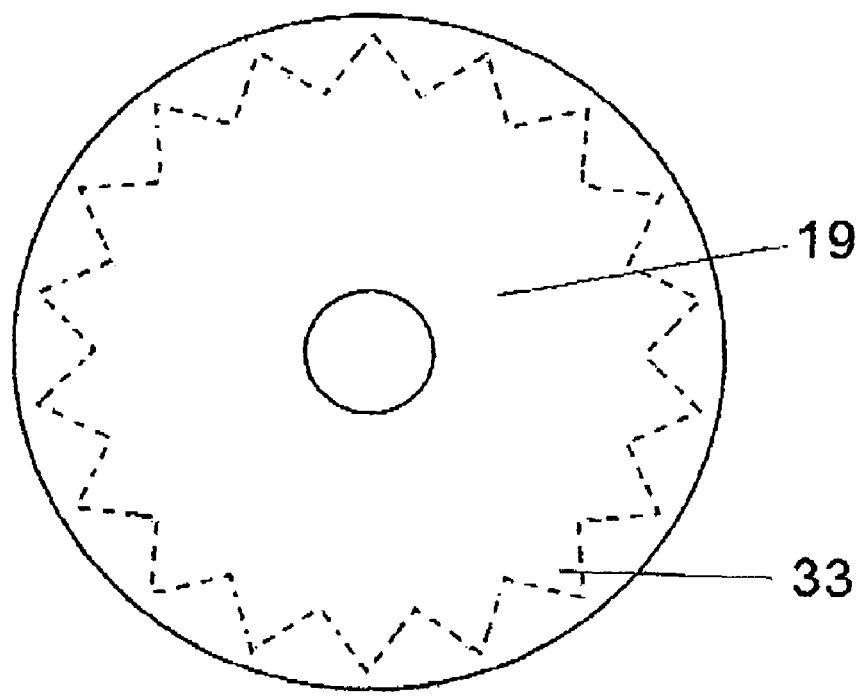
FIG. 13 and FIG. 14 illustrate the top view and the bottom view of the filtering subunit 23 illustrated in FIG. 11, respectively.
Figure 14:
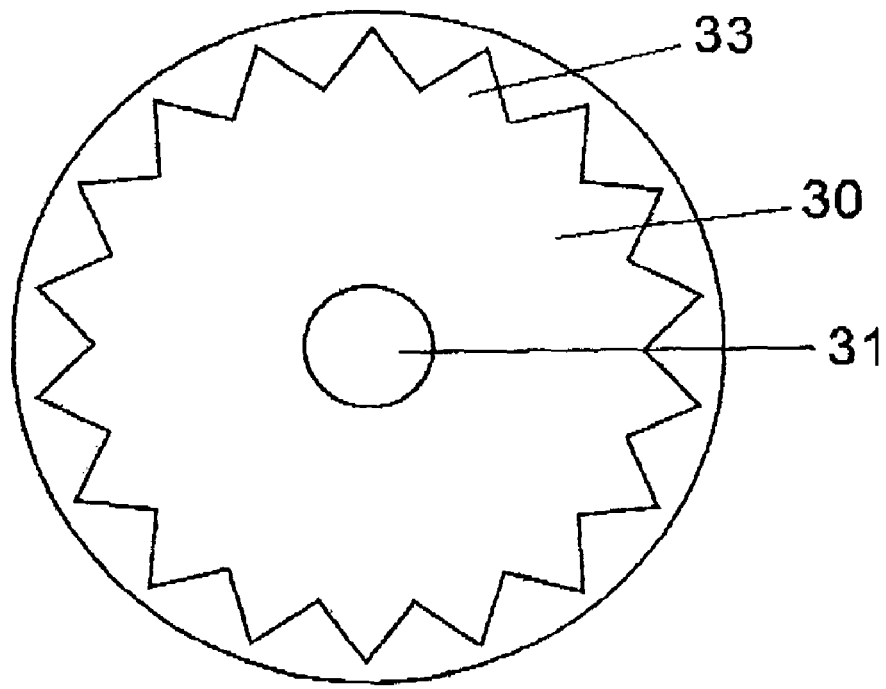

FIG. 11 illustrates a prototype of the outside filter subunit 23, which is a non-disposable, basket-type structure, having its sides pleated or in zigzag pattern 33, and having a substantially flat bottom surface at its lower end 30 and multiple mesh openings 32 showed in detailed in FIG. 12. The mesh type surface is illustrated only partially in the said filtering unit 23 in order to illustrate other structural elements of the said filtering subunit, nonetheless it is intended that the complete surface of the lateral sides of the said filtering unit is a mesh type surface. Filtering unit 23 comprises upper end section 19 and lower end section 30 illustrates in FIG. 11. Lower end 30 comprises a flat surface having opening 31 at substantially the center of the said surface. FIG. 13 and FIG. 14 show top views of the upper end 19 and lower end 30, respectively.

Figure 15:
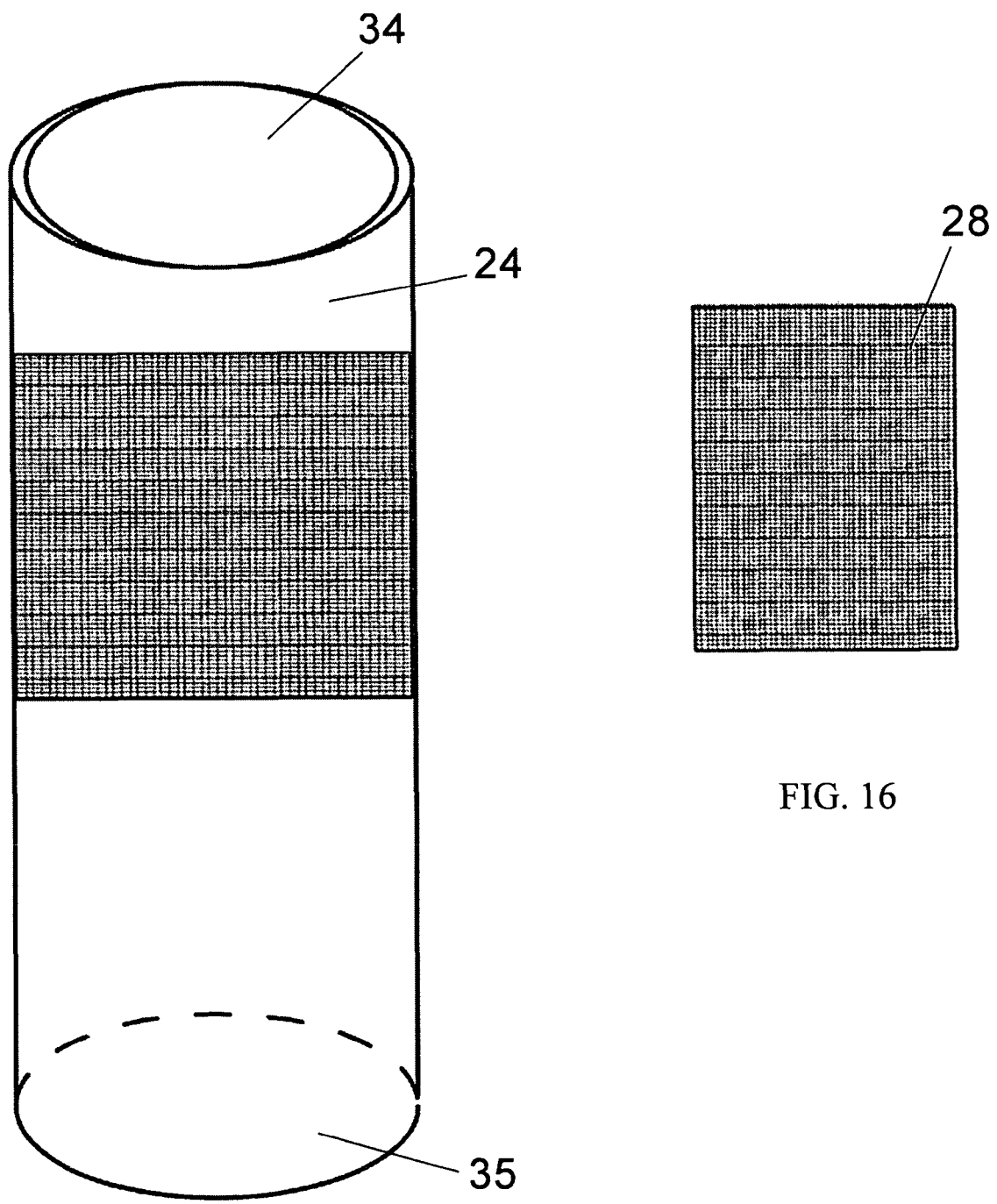
FIG. 15 illustrates a prototype of the optional internal filtering subunit 24. It is represented as a cylindrical, hollow element having a mesh-type surface 28, which is illustrated only partially in order to illustrate other structural elements of the said filtering subunit 24. Nonetheless, it is intended that the complete lateral annular surface of the said filtering subunit 24 has a mesh type surface. The said mesh-type surface 28 is illustrated in detail in FIG. 16. This filtering subunit 24 maybe nested in the interior area of the filtering subunit 23 illustrated in FIG. 11.
Figure 16:
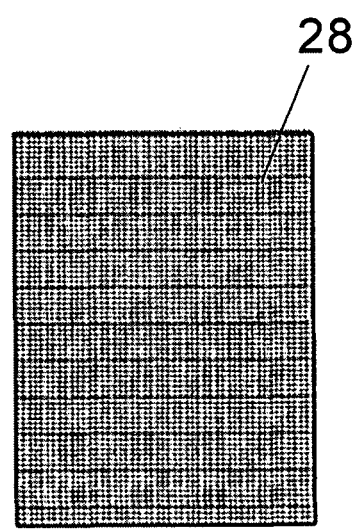

The second filtering unit 24, is illustrated in FIG. 15, a mesh type hollow cylinder having an upper end 34 and a lower end 35. It is non-disposable and easy removable. It has a smaller diameter than filter subunit 23, thus it may be nested inside the said filter subunit 23. The said filter subunit 24 has multiple mesh openings around its complete surface. The said mesh type surface, 28 is illustrated in detail in FIG. 16. The use of the second filtering unit 24 may be optional. In other embodiments, similar filtering subunits in addition to the two filtering units described herein may optionally be nested, one within the others when practicing the invention.

The openings around the surfaces of the said filtering units 23 and 24 may be variable in shape and size, however is preferred that the mesh on both subunits has the same size and shapes. Particularly, considering a mesh as a unit or number of openings in a linear inch, the preferred mesh sizes in the filters subunits may be from 30 to 170, even more preferably from 40 to 150. Regarding the relative sizes, it is even more preferably is that opening in the mesh of the external filtering subunit 23 are relatively smaller than the opening in the mesh of the internal filtering subunit 24. Among the factors determining the particular mesh size of the said filter subunits are the amount of contaminants present in the fuel, the physical characteristics of the said contaminants such as density, the physical and chemical characteristic of the fuel subjected to filtration and the particular use of the fuel filter assembly 20.

A pressure element 49 as illustrated in FIG. 3 may optionally be use to facilitates removing the filtering units. The said pressure element 49 is represented as a short spring around the fuel delivering unit 25. When the fuel filter assembly 20 is closed, the said pressure element is push backward, and it is under pressure against flat surface 30 of filtering subunit 23 and flat surface 54 of base 50. However, once the filter lid 40 is opened, the said pressure element pushes the filtering elements forward, in such a way that the upper parts of the said filtering units 23 and 24 come out of the housing cavity 21.

The fuel filter assembly 20 also comprises fuel delivering unit 25 as illustrated in FIG. 3 and FIG. 8. It is a hollow cylinder having its lower end 38 externally threaded and its upper end 37 internally threaded. Fuel delivering unit 25 also comprises opening 36 in its upper section. FIG. 8 shows delivering unit 25 already assembled to base 50. The said delivering unit 25 may be inserted through opening 31 of the filtering subunit 23 in such a way that the fuel delivering unit is at substantially the center of the internal cavity of the filtering subunits 23 and 24.

Therefore, the fuel filtering unit assembly 20 is assembled by threading fuel delivering unit 25 in opening 52 of base 50; optionally inserting the pressing element 49 into the fuel delivering unit 25, following by inserting the said fuel delivering unit through opening 31 of filtering unit 23 and optionally inserting the filtering subunit 24 inside the cavity of filtering subunit 23; mounting lower end of housing 21 to base 50 and upper end of the said housing 21 to lid 40; and inserting T-shape screw 26 through opening 42 on lid 40 and subsequently threading 26 with upper end 37 of fuel delivering unit 25.

Figure 17:
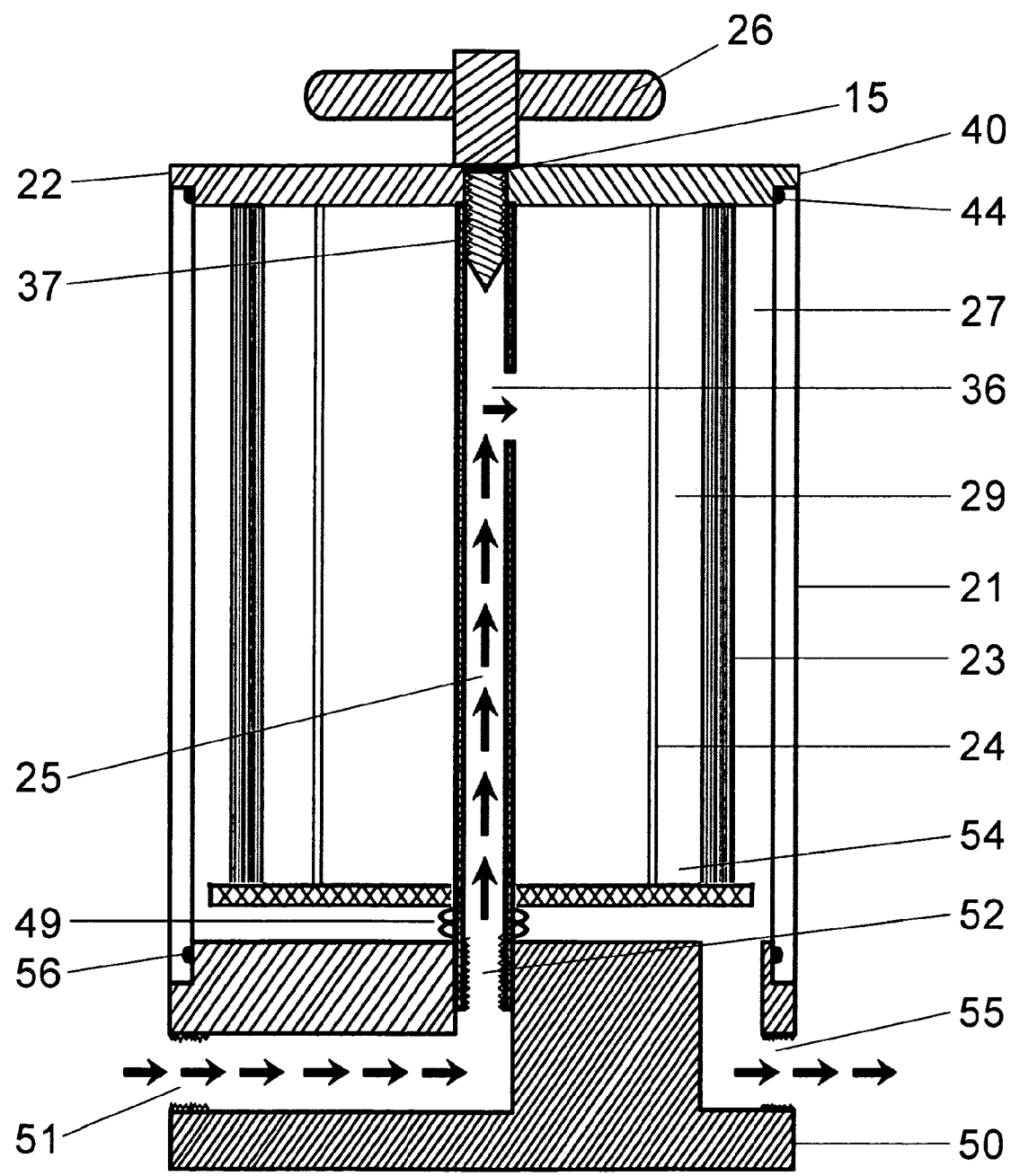
FIG. 17 shows a cross sectional view of the assembled filter device 20. The fuel flow is illustrated by arrows. Connecting line from the fuel tank to the fuel filter assembly and line receiving the filtered fuel from the fuel filter assembly to the desired destination from the fuel outlet are not illustrated.

Regarding FIG. 17, it illustrates a cross sectional view of the fuel filter assembled 20. In operative terms, fuel flows enter the system via the conduit 51 at base 50 and moves internally through the base 50 via the passage defined by apertures 51 and 52. Thus, it comes out of the said base 50 through opening 52, from where the said fuel flow is transported to the fuel delivering unit 25 and from there it is delivered to the top of the filtering units via opening 36 on the upper section of the said fuel delivering unit 25.

Once delivered, the fuel flow pass through the mesh openings 28 of the filtering units 24 to the housing interface 29 between filtering units, subsequently, the fuel flow pass through mesh openings 32 of the second filtering unit 23 from where it drains out to 27, a non-filter section of housing 21. The fuel flow comes out of housing 21 via opening 53 on surface 54 of base 50 from where it comes out of the fuel filter assembly 20 via opening 55. Once filtered, the fuel flow may be directed to the desirable destination. For instance, it may be directed to a tank or it may be directed to the engine or any other fuel consuming device via the engine filtration system. Solid and semisolid particulates such as algae, fungus, rust and similar fuel contaminants remain trapped inside the filter units.

Since the housing 21 may transparent, the user may determine the right time to clean the filter unit by external observation. The filter units are easily clean by opening unscrewing screw 26, separating lid 40 from the upper end of the housing 21 and taking out the filter units 23 and 24. Once contaminants are properly disposed and the filter units 23 and 24 have been washed, it can be readily reinstalled by reinserting the filter unit 23 and 24 within the cavity of housing 21 and further closing the housing upper side as described previously with lid 40.

While the invention has been described with reference to preferred embodiments, it will be understood by those skilled in the art that various changes may be made and equivalents may be substituted for elements thereof without departing from the scope of the invention. In addition, many modifications, particularly in shape or size may be made to adapt a particular situation or material to the teachings of the invention without departing from the essential scope thereof. Therefore, it is intended that the invention not be limited to the particular embodiment disclosed as the best modes contemplated for carrying out the invention, but that the invention will include all embodiments falling within the scope of the appended claims.

What is claimed is:

1. A fuel filter assembly suitable to separate solid and semisolid particulate or contaminants from fuels and similar liquids, said fuel filter assembly comprising:
   a) a vertical upright housing comprising an upper end and a lower end;
   b) a removable lid comprising two concentric cylindrical sections wherein one of such cylindrical sections is wider in diameter than the other cylindrical section; an aperture that passes through substantially the center of said lid; an annular sealing ring inserted around the walls of the cylindrical section with smaller diameter and wherein said cylindrical section with smaller diameter is tightly inserted into the upper end of the vertical upright housing;
   c) a threaded fastening element that passes through the aperture of the lid; said threaded fastening element comprising a handle at its upper section and a threaded lower end;
   d) a base located at the lower end of the said vertical upright housing, said base comprising an outer cylindrical section; an inner cylindrical section located substantially at the center of the outer cylindrical section wherein said outer cylindrical section is wider in diameter than the inner cylindrical section and wherein said outer cylindrical section and said inner cylindrical section physically constitute a single unit; an annular sealing ring inserted around the walls of the inner cylindrical unit and wherein the inner cylindrical section is tightly inserted into the lower end of the vertical upright housing; a fuel flow inlet and a fuel flow outlet, wherein:
   the fuel flow inlet is formed by:
      a first conduit having a threaded first end and a threaded second end, wherein the first end is located substantially at the center of the base and is in direct communication with the second end, wherein said second end is located at the lateral side of the outer cylindrical section of the base and;
   the fuel flow outlet is constituted by:
      a second conduit having a first end, located at the upper surface of the inner cylindrical unit and in direct communication with a second end, said second end located at the lateral side of the outer cylindrical section of said base and wherein said second end is threaded; wherein the first conduit constituting the fuel flow inlet and the second conduit constituting the fuel flow outlet are totally independent channels;
   e) a removable, non disposable filtering unit enclosed in the interior section of said housing, said filtering unit comprising a main body, having multiple mesh-type openings on its surface; wherein the lateral borders of said main body are folded in a zig-zag or star pattern and wherein the top end of said main body is totally open; and a flat bottom surface located at the lower end of said main body, said flat bottom surface having a hole substantially at its center;
   f) a fuel delivering unit for delivering the unfiltered fuel flow from said fuel flow inlet to the upper part of the filtering unit; said fuel delivering unit comprising a hollow tube having an internally threaded upper end; an externally threaded lower end and a lateral aperture at its upper section, wherein said hollow tube is threaded at its upper end to the fastening element and at its lower end to the first end to the fuel flow inlet, thus allowing the entrance of the unfiltered fuel flow at the internal section of the housing and discharging it from the upper part of the filtering unit via said lateral aperture.

2. The fuel filter assembly of claim 1 wherein the handle at the upper section of the fastening element is a T-shaped handle.

3. The fuel filter assembly of claim 1, further comprising a pressure element inserted in said fuel delivering unit and pressed between said filtering unit and said base, in order that once said fuel filter assembly is open, said pressure element push the filtering unit upper end forwardly, facilitating the removal of said fuel filter unit out of said housing.

4. The fuel filter assembly of claim 1, wherein said removable, non disposable filtering unit has a mesh size on a range of about 30 to 160 mesh.

5. The fuel filter assembly of claim 4, wherein said removable, non disposable filtering unit has a mesh size on a range of about 40 to 150 mesh.

6. The fuel filter assembly of claim 1, wherein said removable, non disposable filtering unit is made of a fuel-resistant plastic material.

7. The fuel filter assembly of claim 1, wherein said removable, non disposable filtering unit comprises a metal wire mesh lateral surface.

8. The fuel filter assembly of claim 7, wherein said metal is selected from stainless steel, copper, aluminum, brass, bonze, any other similar metal or combinations thereof.

9. The fuel filter system of claim 1, further comprising a removable, mesh type, second filtering unit inserted into the mesh type, hollow zigzag first filtering unit, said second filtering unit having a cylindrical shape and multiple openings around its lateral surface.

10. The fuel filter assembly of claim 9, wherein said second removable, non disposable internal filtering unit has a mesh size on a range of about 30 to 160 mesh.

11. The fuel filter assembly of claim 10, wherein said second removable, non disposable internal filter subunit has a mesh size on a range of about 40 to 150 mesh.

12. The filter assembly of claim 9, wherein said second removable internal filtering unit comprises a metal wire mesh lateral surface.

13. The fuel filter assembly of claim 12, wherein the said metal is selected from stainless steel, copper, aluminum, brass, bonze, any other similar metal or combinations thereof.

14. The fuel filter assembly of claim 9, wherein said removable internal filtering unit is made of a fuel resistant plastic material.

15. The fuel filtering of claim 9, wherein the mesh openings on the surface of the hollow zigzag filtering unit are relatively smaller than the openings on the surface of the second internal filtering subunit.

16. A fuel filter assembly, suitable to separate algae and microbial growth from fuels, wherein said fuel filter assembly comprises:
   a) a vertical upright housing having an upper end and a lower end;
   b) a removable lid located in the upper end of said vertical upright housing;
   c) a threaded fastening element that passes through the aperture of the lid; said threaded fastening element comprising a handle at its upper section and a threaded lower end;
   d) a base located at the lower end of said vertical upright housing, said base comprising a fuel flow inlet and a fuel flow outlet; wherein said fuel flow inlet and said fuel flow outlet communicate independently from each other with the internal cavity of the said housing;
   e) a removable non disposable filtering unit enclosed in the interior section of said housing, said filtering unit comprising a main body, having multiple mesh-type openings on its surface; wherein the lateral borders of said main body are folded in a zig-zag or star pattern and wherein the top end of said main body is totally open; and a flat bottom surface located at the lower end of said main body, said flat bottom surface having a hole substantially at its center;
   f) a fuel delivering unit for delivering the unfiltered fuel flow from said fuel flow inlet to said upper part of said filtering unit; said fuel delivering unit comprising a hollow tube having an internally threaded upper end; an externally threaded lower end and a lateral aperture at the upper section, wherein said hollow tube is threaded at its upper end to the fastening element and threaded at its lower end to the fuel flow inlet thus allowing the discharge of unfiltered unit at the interior of the filtering unit via its the lateral aperture;
   g) a pressure element inserted in said fuel delivering unit wherein said pressure element is pushed between the filtering unit and the base and that once said fuel filter assembly is open, said pressure element push the filtering unit upper end forwardly, facilitating the removal of said fuel filter unit out of said housing.

* * * * *